US 11,194,345 B2

(12) United States Patent
Flanzer et al.

(10) Patent No.: US 11,194,345 B2
(45) Date of Patent: Dec. 7, 2021

(54) SYSTEMS AND METHODS FOR PITCH AXIS ENVELOPE LIMITING OF AN AIRCRAFT

(71) Applicant: The Boeing Company, Chicago, IL (US)

(72) Inventors: Tristan C. Flanzer, Seattle, WA (US); Uy-Loi Ly, Chicago, IL (US); Kioumars Najmabadi, Chicago, IL (US); Nikos D. Mills, Bellevue, WA (US); Heidi M. Haugeberg, Chicago, IL (US)

(73) Assignee: The Boeing Company, Chicago, IL (US)

( * ) Notice: Subject to any disclaimer, the term of this patent is extended or adjusted under 35 U.S.C. 154(b) by 170 days.

(21) Appl. No.: 16/567,081

(22) Filed: Sep. 11, 2019

(65) Prior Publication Data

US 2021/0072769 A1     Mar. 11, 2021

(51) Int. Cl.
*G05D 1/08* (2006.01)
*B64C 13/16* (2006.01)

(52) U.S. Cl.
CPC .......... *G05D 1/0808* (2013.01); *B64C 13/16* (2013.01); *G05D 1/0833* (2013.01)

(58) Field of Classification Search
CPC .... G05D 1/0808; G05D 1/0833; G05D 1/042; G05D 1/0607; G05D 13/46; G05D 13/50; G05D 13/60; B64C 13/16; B64C 13/04; B64C 13/18; B64G 1/244; B64G 2001/245
See application file for complete search history.

(56) References Cited

U.S. PATENT DOCUMENTS

| | | | |
|---|---|---|---|
| 8,195,346 B1 * | 6/2012 | Duerksen ............... | B64C 13/16 701/15 |
| 9,989,972 B2 | 6/2018 | Eggold et al. | |
| 10,101,173 B2 * | 10/2018 | Ludtke, II ............. | B64D 45/00 |

(Continued)

FOREIGN PATENT DOCUMENTS

EP          0 471 395          2/1992

OTHER PUBLICATIONS

Extended European Search Report prepared by the European Patent Office in application No. EP 20 19 4127.5 dated Jun. 30, 2021.

*Primary Examiner* — Abby Y Lin
*Assistant Examiner* — Esvinder Singh
(74) *Attorney, Agent, or Firm* — McDonnell Boehnen Hulbert & Berghoff LLP

(57) ABSTRACT

An example method of limiting an aircraft to a pitch axis envelope includes determining aircraft state limits associated with multiple pitch axis variables of an aircraft, determining predicted aircraft states, comparing the predicted aircraft states to the aircraft state limits to produce aircraft state errors, translating the aircraft state errors into a set of positive and negative limit elevator commands, selecting a highest priority positive limit elevator command, selecting a highest priority negative limit elevator command, limiting a primary pitch axis control law elevator command of the aircraft to a value that is less than or equal to the highest priority positive limit elevator command and greater than or equal to the highest priority negative limit elevator command, and controlling the aircraft according to the primary pitch axis control law elevator command limited to the value.

20 Claims, 9 Drawing Sheets

(56) References Cited

U.S. PATENT DOCUMENTS

| | | | |
|---|---|---|---|
| 10,967,951 B2* | 4/2021 | Mahmulyin | G05D 1/0066 |
| 2009/0062973 A1 | 3/2009 | Caldeira et al. | |
| 2010/0078518 A1* | 4/2010 | Tran | B64C 13/16 |
| | | | 244/87 |
| 2016/0004255 A1* | 1/2016 | Moxon | G05D 1/0607 |
| | | | 701/7 |
| 2017/0060141 A1* | 3/2017 | Leopold | B64C 13/16 |
| 2017/0210461 A1* | 7/2017 | Siu | B64C 27/10 |
| 2018/0037313 A1* | 2/2018 | Harden | B64C 13/16 |
| 2019/0003853 A1* | 1/2019 | Tremblay | G08G 5/0021 |
| 2019/0127079 A1* | 5/2019 | Ribeiro | B64D 45/00 |
| 2019/0265729 A1* | 8/2019 | Gillett | B64C 13/503 |
| 2020/0026275 A1* | 1/2020 | Barriety | B64C 13/16 |
| 2020/0026307 A1* | 1/2020 | Lax | G05D 1/042 |
| 2020/0103897 A1* | 4/2020 | Thornberg | B64C 19/00 |

* cited by examiner

SYSTEMS AND METHODS FOR PITCH AXIS ENVELOPE LIMITING OF AN AIRCRAFT

FIELD

The present disclosure relates generally to methods of limiting an aircraft to a pitch axis envelope and, more specifically to, employing dynamic elevator command limits to control an aircraft to remain within a desired pitch axis envelope.

BACKGROUND

Flight control systems on aircraft in the form of envelope protection and envelope limiting control laws can be used to assist with operation of the aircraft. Envelope limiting control laws act to prevent an aircraft from exceeding flight envelope parameters beyond which a significant degradation in safety can occur.

Envelope limiting control laws are typically designed to only activate when an aircraft has exceeded, or is about to exceed, a limit flight envelope. The manner of this activation can enable both robust limiting and transitions in and out of envelope limiting control law modes that are imperceptible to a flight crew.

SUMMARY

In an example, a method of limiting an aircraft to a pitch axis envelope is described that comprises determining aircraft state limits associated with multiple pitch axis variables of an aircraft, where the aircraft state limits define the limit pitch axis envelope. The method also comprises determining predicted aircraft states based on current pitch axis variables of the aircraft and rates associated with the current pitch axis variables, and the predicted aircraft states are indicative of aircraft states at a future time. The method also comprises comparing the predicted aircraft states to the aircraft state limits to produce aircraft state errors for each of the multiple pitch axis variables, and translating the aircraft state errors into a set of positive and negative limit elevator commands. A respective limit elevator command represents an elevator position of a flight control surface of the aircraft that will prevent exceedance of the respective aircraft state limits. The method also comprises comparing the set of positive limit elevator commands to each other and selecting a highest priority positive limit elevator command, and comparing the set of negative limit elevator commands to each other and selecting a highest priority negative limit elevator command. The method also comprises limiting a primary pitch axis control law elevator command of the aircraft to a value that is less than or equal to the highest priority positive limit elevator command and greater than or equal to the highest priority negative limit elevator command, and controlling the aircraft according to the primary pitch axis control law elevator command limited to the value.

In another example, a system is described comprising a non-transitory computer-readable medium having stored therein a plurality of executable instructions, and a processor adapted to execute the plurality of executable instructions to determine aircraft state limits associated with multiple pitch axis variables of an aircraft. The instructions are further executable to determine predicted aircraft states based on current pitch axis variables of the aircraft and rates associated with the current pitch axis variables, and the predicted aircraft states are indicative of aircraft states at a future time. The instructions are further executable to compare the predicted aircraft states to the aircraft state limits to produce aircraft state errors for each of the multiple pitch axis variables, and translate the aircraft state errors into a set of positive and negative limit elevator commands. A respective limit elevator command represents an elevator position of a flight control surface of the aircraft that will prevent exceedance of the respective aircraft state limits. The instructions are further executable to compare the set of positive limit elevator commands to each other and selecting a highest priority positive limit elevator command, and compare the set of negative limit elevator commands to each other and selecting a highest priority negative limit elevator command. The instructions are further executable to limit a primary pitch axis control law elevator command of the aircraft to a value that is less than or equal to the highest priority positive limit elevator command and greater than or equal to the highest priority negative limit elevator command, and control the aircraft according to the primary pitch axis control law elevator command limited to the value.

In another example, a non-transitory computer-readable medium is described having stored therein a plurality of executable instructions, which when executed by a computing device having a processor causes the computing device to perform functions comprising determining aircraft state limits associated with multiple pitch axis variables of an aircraft. The functions also comprise determining predicted aircraft states based on current pitch axis variables of the aircraft and rates associated with the current pitch axis variables, and the predicted aircraft states are indicative of aircraft states at a future time. The functions also comprise comparing the predicted aircraft states to the aircraft state limits to produce aircraft state errors for each of the multiple pitch axis variables, and translating the aircraft state errors into a set of positive and negative limit elevator commands. A respective limit elevator command represents an elevator position of a flight control surface of the aircraft that will prevent exceedance of the respective aircraft state limits. The functions also comprise comparing the set of positive limit elevator commands to each other and selecting a highest priority positive limit elevator command, and comparing the set of negative limit elevator commands to each other and selecting a highest priority negative limit elevator command. The functions also comprise limiting a primary pitch axis control law elevator command to a value that is less than or equal to the highest priority positive limit elevator command and greater than or equal to the highest priority negative limit elevator command. The function also comprises controlling the aircraft according to the primary pitch axis control law elevator command limited to the value.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Figure 1:
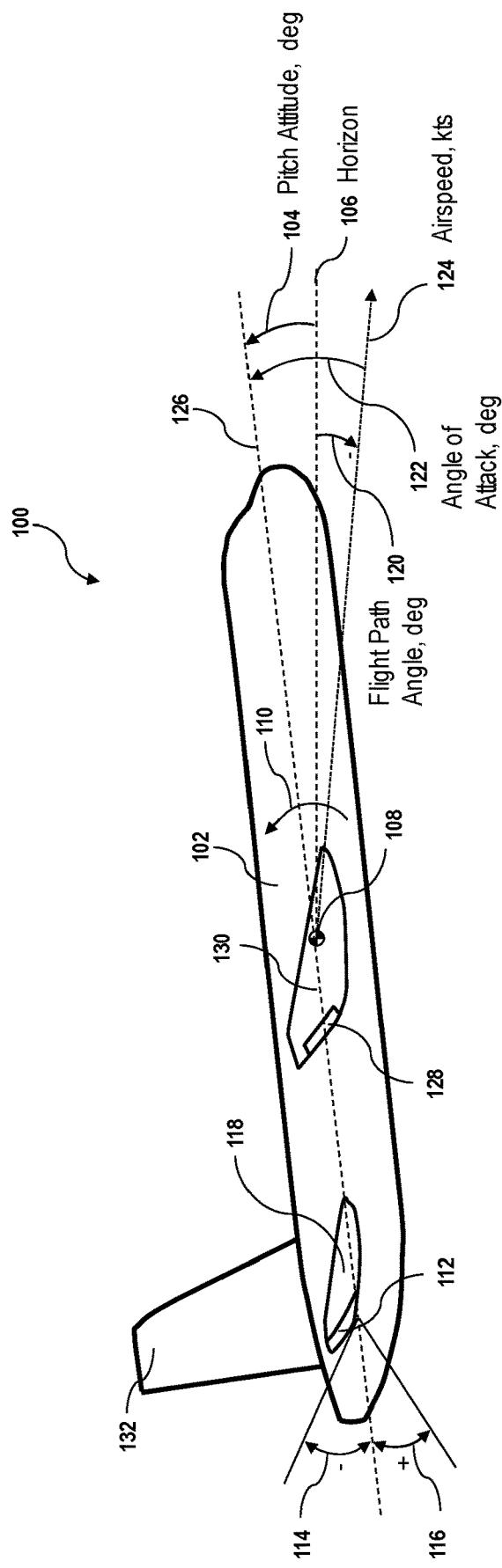
FIG. 1 illustrates a diagram of an aircraft, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Envelope-limiting control laws are meant to protect the aircraft from exceeding flight envelope parameters, beyond which a significant degradation in safety may occur. Examples described herein encompass a control law for limiting pitch axis states including, but not limited to, angle of attack, load factor, pitch attitude, and airspeed. Thus, within examples, systems and methods for pitch axis envelope limiting of an aircraft are described. A proximity of multiple pitch axis variables to aircraft state limits is used to calculate elevator limit commands, which when applied as limits to a primary pitch axis control law elevator command, ensure the aircraft does not exceed the aircraft state limits.

Examples described below produce a set of relative differences by comparing a current aircraft state to a set of pitch axis limits. The differences are translated into limit elevator commands, and then the limit elevator commands are prioritized, and a desired degree of elevator command is selected to operate the aircraft within a pitch axis envelope. Examples described below thus provide methods for providing prioritized envelope limiting of multiple pitch axis variables including angle of attack, load factor (n=L/W, where n is load factor, L is lift, and W is weight; load factor is a ratio of the lift of an aircraft to its weight and represents a measure of stress to which a structure of the aircraft is subjected), pitch attitude, and calibrated airspeed or Mach number.

Implementations of this disclosure provide technological improvements that are particular to computer technology, for example, those concerning computer assistance for operation of an aircraft. Computer-specific technological problems, such as providing envelope-limiting control laws for aircraft operation, can be wholly or partially solved by implementations of this disclosure. For example, implementation of this disclosure allows for aircraft to be operated within a pitch axis envelope based on pilot command, and the pilot may operate the aircraft up to the pitch axis envelope limits, at which time the computer prevents exceeding a pitch axis envelope. Unlike some existing envelope limiting control laws, this disclosure proposes limiting the final elevator command directly. As a result, elevator commands that would otherwise create a large and undesirable pitch response are intercepted before they are allowed to set the final elevator command. Other control law architectures which engage strictly based on when a pitch axis state exceeds a threshold are more reactionary compared to the proposed approach. A reactionary design needs to respond more aggressively to achieve equivalent performance to the proposed method, resulting in a less desirable aircraft response and perceptible transient behavior that can result in objectionable handling qualities. A feature of the envelope limiting control architecture proposed in this disclosure is that it is independent from a primary pitch axis control law architecture. Another advantage of the implementation of this disclosure is the lack of complex logic to manage the transition between a primary pitch axis control law and multiple envelope limiting control modes. Further, another advantage is the absence of notable transients that may be perceived by the flight crew as the limiting activates and deactivates.

Referring now to the figures, FIG. 1 illustrates a diagram of an aircraft 100, according to an example implementation. In some examples, the aircraft 100 may be a long-bodied commercial aircraft. In other examples, the aircraft 100 may be any aircraft. As shown in FIG. 1, the aircraft includes a fuselage 102 oriented with a positive (e.g., +) pitch attitude 104 relative to a horizon 106. The positive pitch attitude 104 may correspond to the aircraft 100 nose-up. Furthermore, the aircraft 100 may be rotating around gravity location corresponding to the aerodynamic center 108 with a longitudinal pitching moment 110. The aircraft 100 includes an elevator 112, and the pitch moment 110 is, at least in part, dependent on a magnitude of change of a negative elevator deflection 114 and/or a positive elevator deflection 116.

Figure 3:
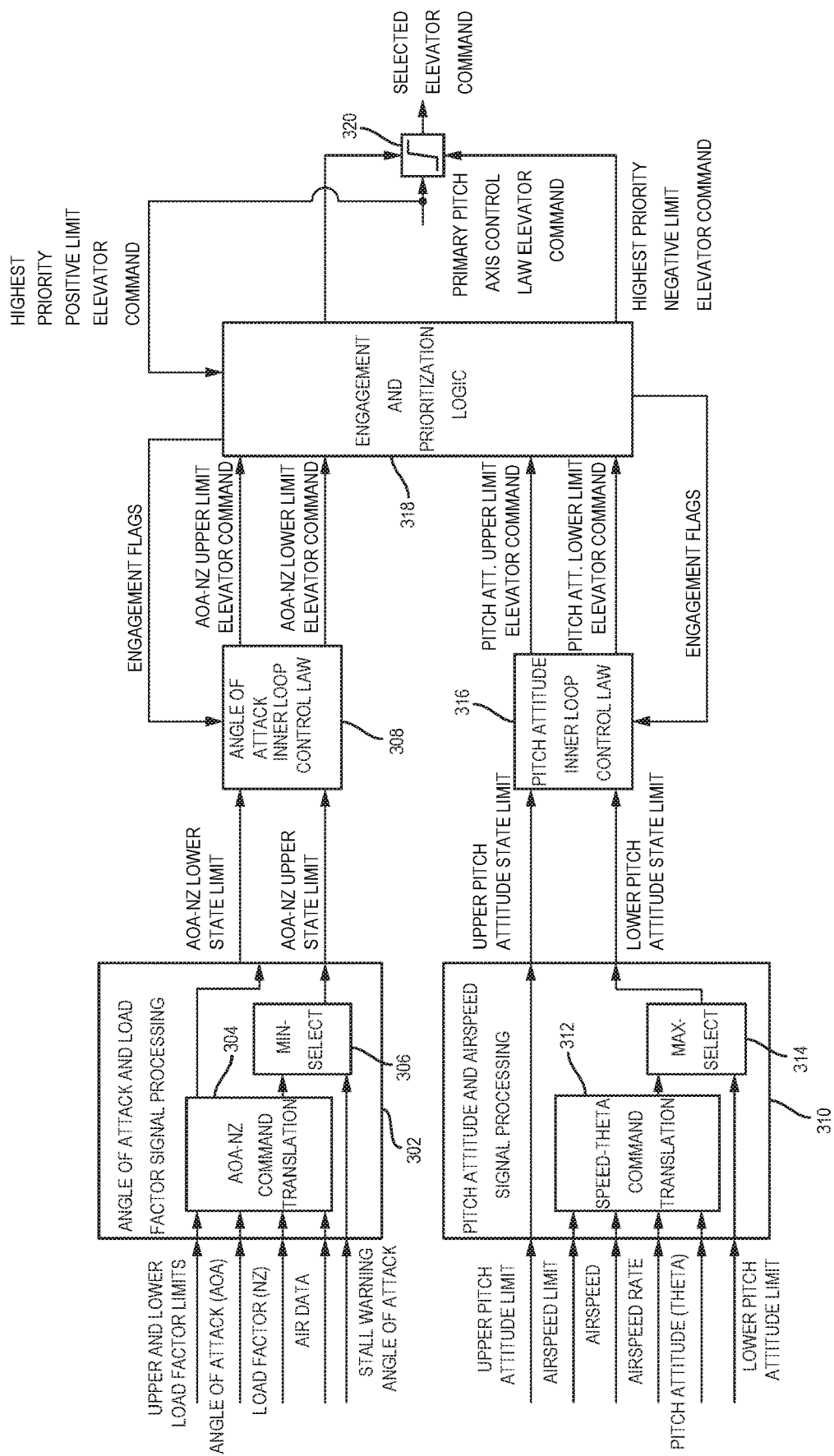
FIG. 3 is a block diagram illustrating functions for limiting an aircraft to a pitch axis envelope, according to an example implementation.

In some examples, an aircraft pilot and/or co-pilot may exert a control column force to generate an elevator deflection command signal (such as a primary pitch axis control law elevator command in FIG. 3) to adjust the elevator 112. In other examples, an autopilot may generate an elevator deflection command signal to adjust the elevator 112. The elevator command signal may command the elevator 112 to respond with the negative elevator deflection 114 generating a positive (e.g., nose up) pitching moment 110. An elevator command signal may command the elevator 112 to respond with the positive elevator deflection 116 generating a negative (e.g., nose down) pitching moment 110.

As shown in FIG. 1, a negative flight path angle 120 may be determined as the angle of an aircraft airspeed 124 from the horizon 106 as the aircraft 100 is descending. In some examples, the airspeed 124 may be the calibrated airspeed of the aircraft 100. An angle of attack 122 may be determined as the angle between the airspeed 124 and a mid-body reference 126.

The aircraft 100 also includes a plurality of sensors positioned on the aircraft 100, such as sensors on the wing 130, a sensor on an engine, and/or a sensor on the vertical stabilizer 132. The aircraft 100 may include many sensors (not shown) and positioned throughout the aircraft 100 either on exterior or interior components. The plurality of sensors provide outputs, such as data indicating airspeed or ground speed, positions of control surfaces, angle of attack, aircraft accelerations, aircraft attitudes, etc.

Figure 2:
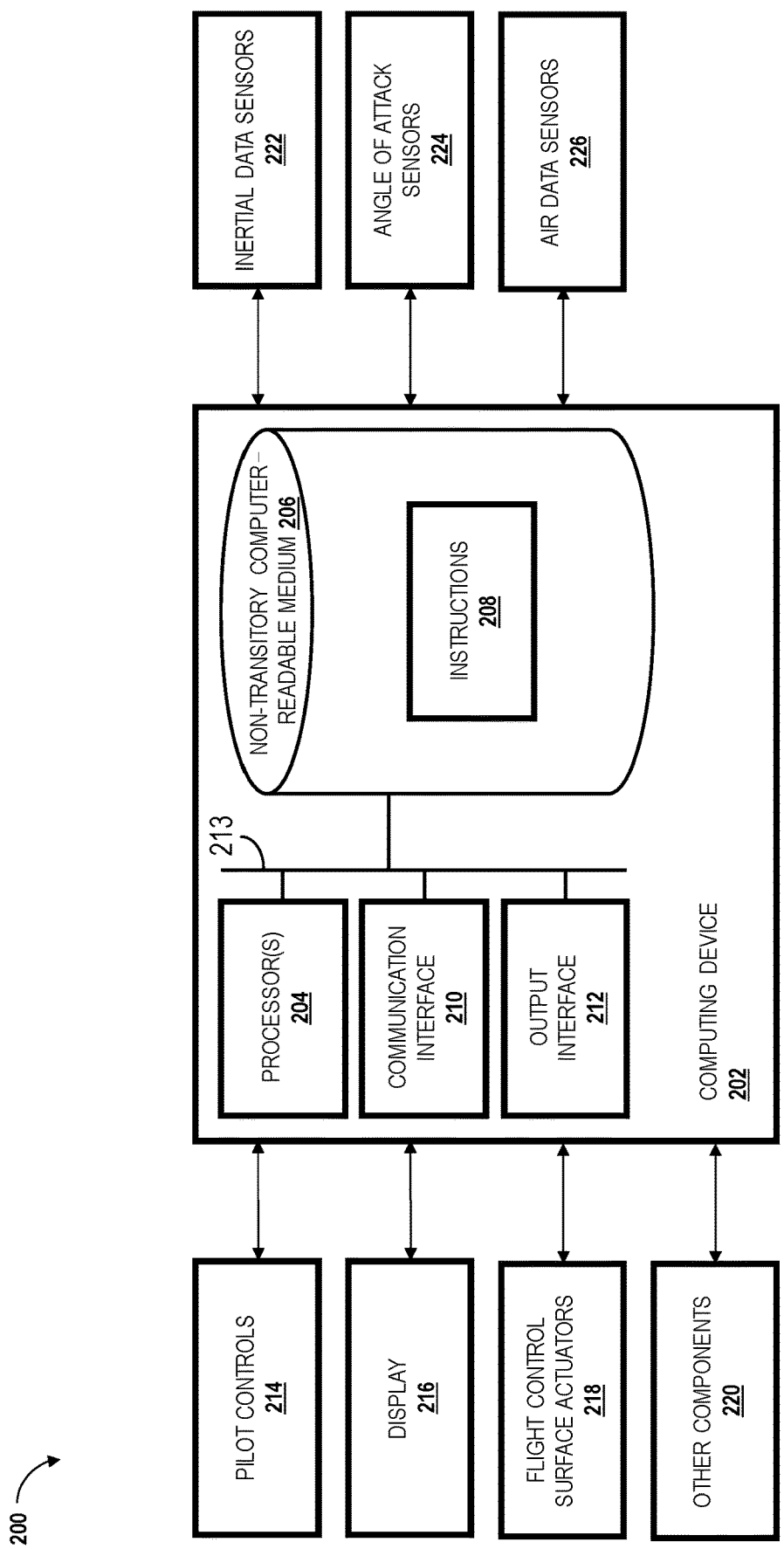
FIG. 2 illustrates a block diagram of a system for use with the aircraft, according to an example implementation.

FIG. 2 illustrates a block diagram of a system 200 for use with the aircraft 100, according to an example implementation. The system 200 may be used to receive sensor measurement signals from various sensors within the system 200 to determine aircraft pitch attitude 104, angle of attack 122, and airspeed 124, among other aircraft parameters. The system 200 may be used to compute a set of positive and negative limit elevator commands, and to limit the primary pitch axis control law elevator command to a value that is less than or equal to the highest priority positive limit elevator command and greater than or equal to the highest priority negative limit elevator command, in accordance with various techniques described herein. In one example, various components of the system 200 may be distributed within the aircraft 100. FIG. 2 illustrates the system 200 including a computing device 202, pilot controls 214, display 216, inertial data sensors 222, which include accelerometers, gyroscopes etc., angle of attack sensors 224, air data sensors 226, flight control surface actuators 218, and other components 220.

The computing device 202 has one or more processors 204 and a non-transitory computer-readable medium 206 having stored thereon instructions 208, that when executed by the one or more processors 204, cause the computing device 202 to perform functions. The functions, described in detail below, include limiting the primary pitch axis control law elevator command to a value that is less than or equal to the highest priority positive limit elevator command and greater than or equal to the highest priority negative limit elevator command, for example.

The computing device 202 may be located on-board the aircraft 100 or within a ground computing system as well. To perform the functions noted above, the computing device 202 includes a communication interface 210, an output interface 212, and each component of the computing device 202 is connected to a communication bus 213. The computing device 202 may also include hardware to enable communication within the computing device 202 and between the computing device 202 and other devices (not shown). The hardware may include transmitters, receivers, and antennas, for example.

The communication interface 210 may be a wireless interface and/or one or more wireline interfaces that allow for both short-range communication and long-range communication to one or more networks or to one or more remote devices. Such wireless interfaces may provide for communication under one or more wireless communication protocols, Bluetooth®, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. Thus, the communication interface 210 may be configured to receive input data from one or more devices, and may also be configured to send output data to other devices.

The non-transitory computer-readable medium 206 may include or take the form of memory, such as one or more computer-readable storage media that can be read or accessed by the one or more processors 204. The computer-readable storage media can include volatile and/or non-volatile storage components, such as optical, magnetic, organic or other memory or disc storage, which can be integrated in whole or in part with the one or more processors 204. The non-transitory computer-readable medium 206 is considered non-transitory computer-readable media. In some examples, the non-transitory computer-readable medium 206 can be implemented using a single physical device (e.g., one optical, magnetic, organic or other memory or disc storage unit), while in other examples, the non-transitory computer-readable medium 206 can be implemented using two or more physical devices.

The non-transitory computer-readable medium 206 thus is a computer-readable medium, and the instructions 208 are stored thereon. The instructions 208 include computer-executable code.

In various examples, the non-transitory computer-readable medium 206 may be included as part of the system 200 and/or as separate from the system 200, with stored instructions provided to the system 200 by coupling the non-transitory computer-readable medium 206 to the system 200 and/or by the system 200 downloading (e.g., via a wired or wireless link) the instructions from the non-transitory computer-readable medium 206.

The one or more processors 204 may be general-purpose processors or special purpose processors (e.g., digital signal processors, application-specific integrated circuits, etc.). The one or more processors 204 may receive inputs from the communication interface 210 as well as outputs from other sensors, and process them to generate outputs that are stored in the non-transitory computer-readable medium 206. The one or more processors 204 can be configured to execute the instructions 208 (e.g., computer-readable program instructions) that are stored in the non-transitory computer-readable medium 206 and are executable to provide the functionality of the computing device 202 described herein.

The output interface 212 outputs information for reporting or storage, and thus, the output interface 212 may be similar to the communication interface 210 and can be a wireless interface (e.g., transmitter) or a wired interface as well.

The computing device 202 is adapted to interface and communicate with components 214, 216, 222, 224, and 226 to perform method and processing steps as described herein.

Sensors of the system 200 provide for sensing inertial motion (e.g., inertial acceleration and gyroscopic motion from sensor 222), aircraft angle of attack from sensor 224, air data, including but not limited to airspeed, from sensor 226. In some examples, sensors 222, 224, and/or 226 may be implemented as discrete hardware devices. Sensors may provide sensor measurement signals (e.g., sensor data) for aircraft states like the current pitch attitude 104, current load factor, the current angle of attack 122, and the current airspeed 124.

The processor(s) 204 may be adapted to receive sensor data from sensors, process sensor data, store sensor data in the non-transitory computer-readable medium 206, and/or retrieve stored sensor data from the non-transitory computer-readable medium 206. In various examples, sensors may be remotely positioned and the processor(s) 204 may be adapted to remotely receive sensor measurement signals from sensors via wired or wireless communication buses within the aircraft 100. The processor(s) 204 may be adapted to process sensor data stored in the non-transitory computer-readable medium 206 to provide sensor data to the display 216 for viewing by a user.

The display 216 includes, in one example, a display device (e.g., a liquid crystal display (LCD)) or various other types of generally known video displays, monitors, and/or gauges for use with the system 200. The processor(s) 204 may be adapted to display sensor data and information on the display 216. The processor(s) 204 may be adapted to retrieve sensor data and information from the non-transitory computer-readable medium 206 and display any retrieved sensor data and information on the display 216. The display 216 may include display electronics, which may be utilized by the processor(s) 204 to display sensor data and information. The display 216 may receive sensor data and information directly from one or more sensors (e.g., sensors 222, 224, and 226) via processor 204, or the sensor data and information may be transferred from the non-transitory computer-readable medium 206 via processor 204.

The pilot controls 214 include, in one example, a user input and/or interface device having one or more user actuated components, such as a stick, a yoke, and/or other control devices that are adapted to generate one or more user actuated input control signals. In another example, the pilot controls 214 include an autopilot system providing the same or similar control signals. The processor(s) 204 may be adapted to sense control input signals from the pilot controls 214 and respond to any sensed control input signals received therefrom. For example, the pilot controls 214 may provide control input signals via a control device to adjust primary flight control surfaces. In various examples, it should be appreciated that the pilot controls 214 may be adapted to include one or more other user-activated mechanisms to provide various other control operations of the system 200, such as navigation, communication, pitch control, roll control, yaw control, thrust control, and/or various other features and/or parameters.

Other types of the pilot controls 214 may be contemplated, such as, a graphical user interface (GUI), which may be integrated as part of the display 216 (e.g., a user actuated touch screen), having one or more images of the user-activated mechanisms (e.g., buttons, knobs, sliders, or others), which are adapted to interface with a user and receive user input control signals via the display 216. The pilot controls 214 may be adapted to be integrated as part of the display 216 to operate as both a user input device and a display device, such as, for example, a touch screen device adapted to receive input signals from a user touching different parts of the display screen.

The flight control surface actuators 218 include, in one example, actuators to primary flight control surfaces of the aircraft 100. Primary flight control surfaces may include the elevator 112. In some examples, a pilot and/or co-pilot may adjust a longitudinal pitch attitude 104 of the aircraft 100 by applying a control column force or position to adjust the elevator 112 of the horizontal stabilizer 118. The control column force may generate an elevator command signal to adjust an elevator deflection (e.g., elevator deflection 114 and/or 116). In other examples, an autopilot system (e.g., provided as part of the pilot controls 214) may generate an elevator command signal to adjust the elevator deflection 114 and/or 116. The processor(s) 204 may receive the elevator command signal and provide a corresponding elevator deflection signal to adjust the elevator 112 of horizontal stabilizer 118.

Other primary flight control surfaces may be located on wing 130 and the vertical stabilizer 132. The processor(s) 204 may receive a command from the pilot controls 214 to adjust the aileron 128 coupled to wing 130 to provide a change to roll of the aircraft 100. The processor(s) 204 may receive a command from the pilot controls 214 to adjust the vertical stabilizer 132 (e.g., by adjustment of a movable rudder as part of vertical stabilizer 132) to provide a yaw control of the aircraft 100.

In other examples, the system 200 may include other components 220, including environmental and/or operational sensors, depending on the sensed application or implementation, which provide information to the processor(s) 204 (e.g., by receiving sensor measurement signals from each of other components 220). In various examples, other components 220 may be adapted to provide signal data and information related to operating and/or environmental conditions, such as internal and/or external temperature conditions, lighting conditions (e.g., beacons mounted on the wing 130 and/or the fuselage 102) and/or distance (e.g., laser rangefinder or radio altimeter). Accordingly, other components 220 may include one or more conventional sensors as would be known by those skilled in the art for monitoring various conditions (e.g., environmental, operational conditions, aircraft configuration, and/or aircraft state) on the aircraft 100.

Within one example, in operation, when the instructions 208 are executed by the processor(s) 204 of the computing device 202, the processor(s) 204 are caused to perform functions for limiting an aircraft to a pitch axis envelope.

FIG. 3 is a block diagram illustrating functions for limiting an aircraft to a pitch axis envelope, according to an example implementation. Functions illustrated in FIG. 3 may take the form of instructions executed by the processor(s) 204 of the system 200, for example.

FIG. 3 illustrates two signal processing sub-systems, 302 and 310. A first sub-system is an angle of attack (AOA) and load factor (Nz) signal processing sub-system 302, in which initially, upper and lower load factor limits are provided and converted into an equivalent AOA as shown at block 304. Equation 1 relates Nz and AOA as follows $$n_{z,cg} W = q_{dyn} S (C_{z\alpha} \alpha + C_{zother}) \qquad \text{(Equation 1)}$$

where $C_{z\alpha}$ represents the rate of change in z-force coefficient $C_z$ with angle of attack, and $C_{zother}$ represents contributions to z-force coefficient $C_z$ from all other terms including aircraft states, control surface deflections, etc. The Greek symbol $\alpha$ represents angle of attack. Aircraft weight is represented using the variable W, aircraft wing area as S, and dynamic pressure as $q_{dyn}$. Load factor at the center of gravity is represented as $n_{z,cg}$.

Equation 1 can be re-arranged to express the angle of attack at which the load factor is equal to the load factor limit, $n_{z,lim}$, as in Equation 2.

$$\alpha_{nzlim} = \frac{W}{q_{dyn} S C_{z\alpha}} (nz_{lim} - nz_{cg}) + \alpha \qquad \text{(Equation 2)}$$

Conversely, Equation 1 can also be re-arranged to express the load factor at which the aircraft angle of attack is equal to the limit angle of attack, $\alpha_{lim}$, as in Equation 3.

$$n_{z,\alpha lim} = \frac{q_{dyn} S C_{z\alpha}}{W} (\alpha_{lim} - \alpha) + n_{z,cg} \qquad \text{(Equation 3)}$$

Further details of the conversion of the Nz to an equivalent AOA, or AOA to an equivalent Nz, are described below with reference to FIGS. 4 and 5.

Next, at block 306, an AOA limit for the aircraft is received (in the example implementation shown in FIG. 3, this is a stall warning angle of attack limit) and compared with the load factor limit in terms of degrees of angle of attack (e.g., output of Equation 2) to select a minimum of these two inputs. The conversion of a lower load factor limit to degrees of angle of attack (e.g., Equation 2) is shown in FIG. 3. Sub-system 302 sends an AOA-Nz upper and lower state limit to an AOA control law inner loop, as shown at block 308. Details of the AOA control law inner loop are described below with reference to FIG. 7.

A second sub-system is a speed to pitch attitude sub-system 310, in which an airspeed limit is provided and converted into an equivalent pitch attitude state limit, as shown at block 312. Details of the conversion of the speed to an equivalent pitch attitude are described below with reference to FIG. 6.

Following, a lower pitch attitude limit for the aircraft is received and compared with the airspeed-dependent lower pitch attitude limit to select a maximum of these two inputs, as shown at block 314. For example, if the aircraft 100 is above a given airspeed limit, it may be necessary to bring the nose up to slow down. In addition, it is desired that the aircraft 100 does not go below a lower nose down pitch angle limit, and thus, a most restrictive (i.e. maximum) of these two inputs is selected. Sub-system 310 produces an upper and lower pitch attitude aircraft state limit which are provided to a pitch attitude control law inner loop, as shown at block 316. Details of the pitch attitude control law inner loop are described below with reference to FIG. 7.

Outputs of the angle of attack and pitch attitude inner loop control laws, Sub-systems 308 and 316, are upper and lower elevator limit commands which are provided to engagement and prioritization logic 318. Engagement logic is based on a continuous comparison between the elevator limit commands and the primary pitch axis control law elevator command.

Highest priority positive and negative limit elevator commands are chosen based on a prioritization between limited aircraft states. These are provided as saturation limits on the primary pitch axis control law elevator command in block 320, such that the computing device 202 operates the elevator 112 of the aircraft according to the output of block 320. Details of the prioritization logic are described below with reference to FIG. 8.

Figure 4:
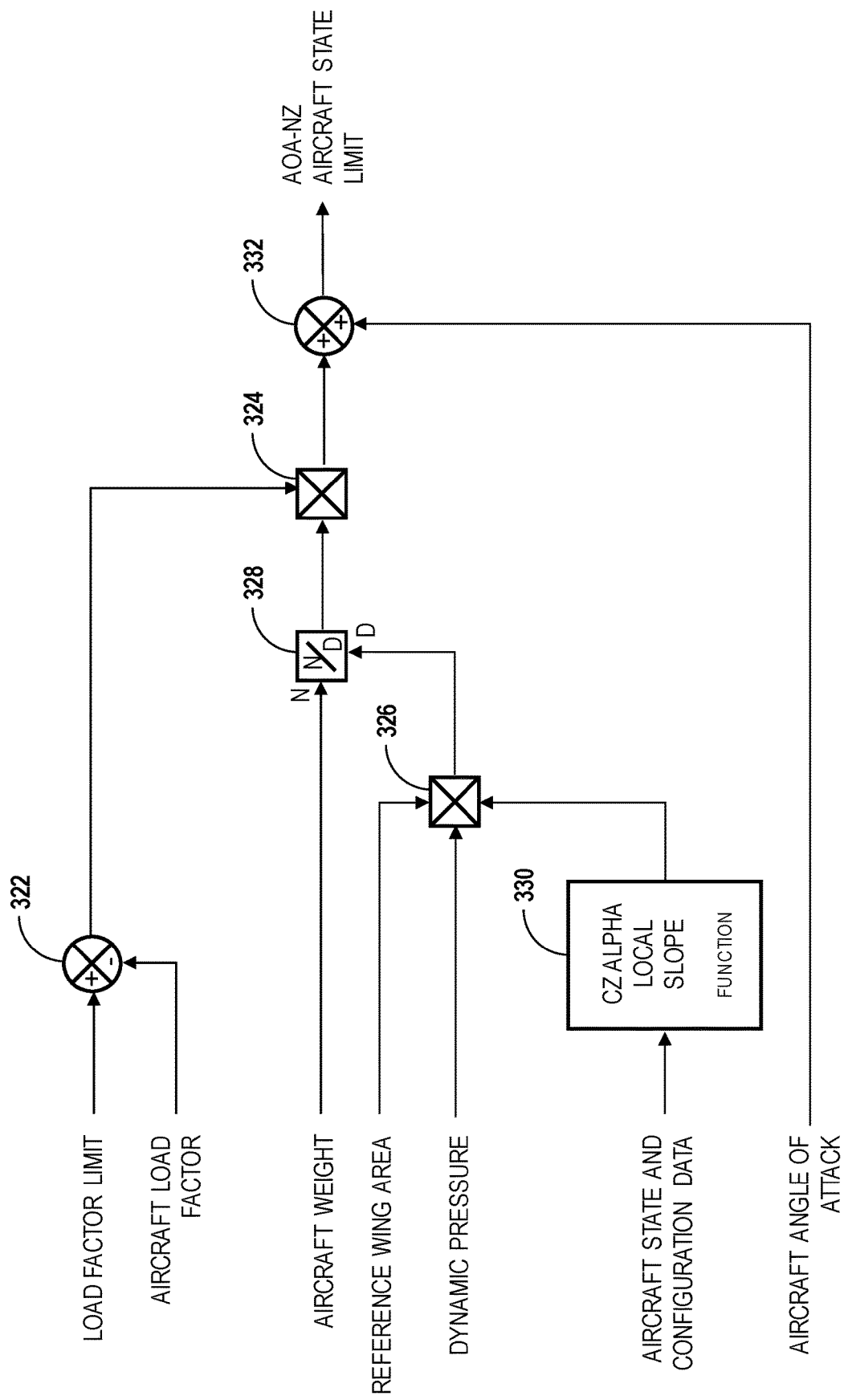
FIG. 4 is a block diagram illustrating functions for conversion of a load factor aircraft state limit to an equivalent angle of attack aircraft state limit, according to an example implementation.

FIG. 4 is a block diagram illustrating functions for conversion of a load factor limit to an equivalent angle of attack aircraft state limit, according to an example embodiment. It implements the calculation in Equation 2. Block 330 represents the calculation of $C_{z\alpha}$, which may be a function of the aircraft state (for example, Mach number) and configuration data (for example, aircraft flap configuration). Product block 326 forms the denominator of the first term in Equation 2, as reference wing area multiplied by dynamic pressure and C. Division block 328 completes the calculation of the first term in Equation 2 by dividing aircraft weight by the output of product block 326. Sum junction 322 subtracts a load factor limit from the aircraft load factor and multiplies this in product block 324 by the output of division block 328. Current aircraft angle of attack is added to the output of product block 324 in sum block 332. FIG. 4 is an example implementation of sub-system 304 in in FIG. 3.

Figure 5:
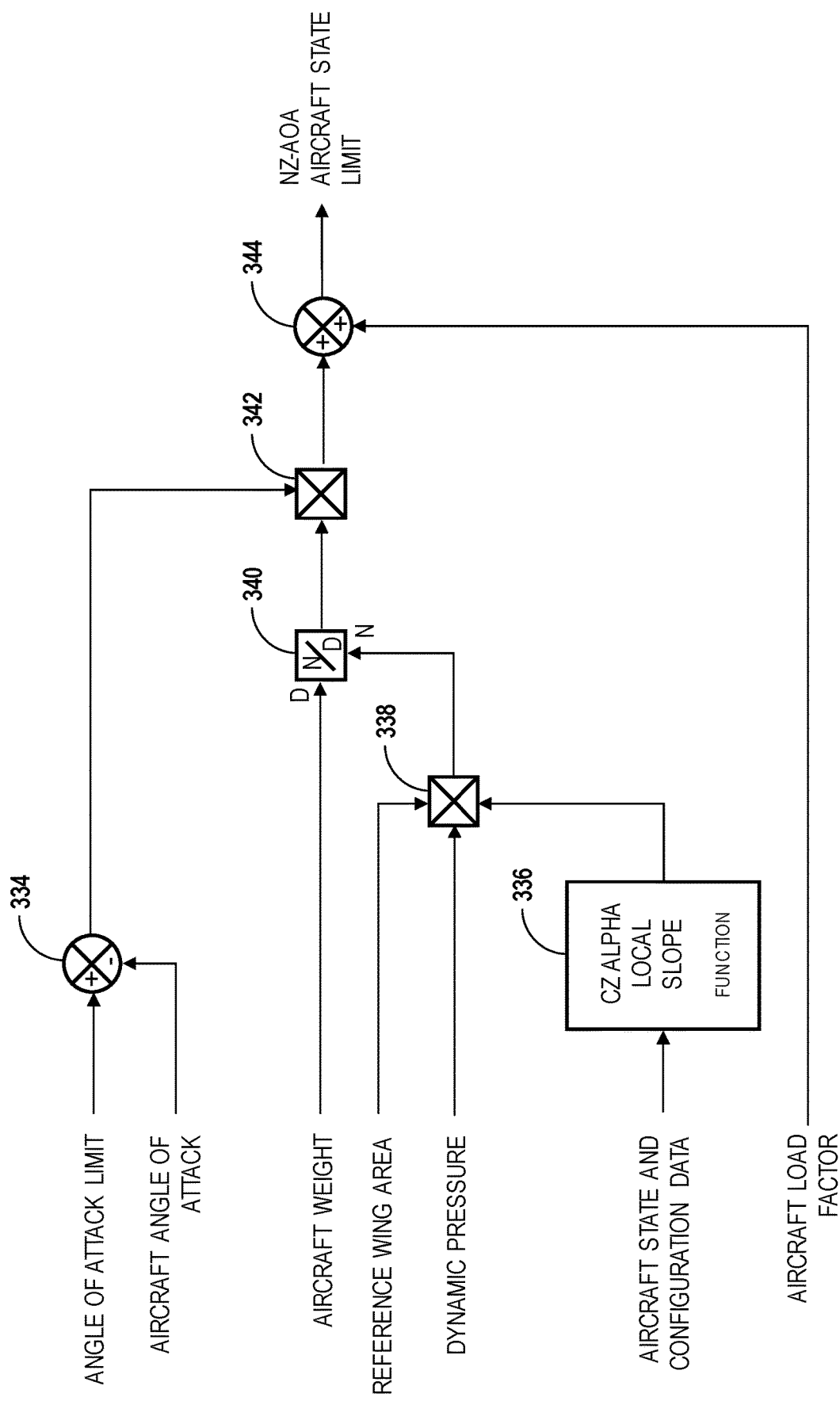
FIG. 5 is a block diagram illustrating functions for conversion of an angle of attack aircraft state limit to an equivalent load factor aircraft state limit, according to an example implementation.

FIG. 5 is a block diagram illustrating functions for conversion of an angle of attack limit in degrees to an equivalent load factor aircraft state limit, according to an example embodiment. It implements the calculation in Equation 3. Block 336 represents the calculation of $C_{z\alpha}$, which may be a function of the aircraft state (for example, Mach number) and configuration data (for example, aircraft flap configuration). Product block 338 forms the numerator of the first term in Equation 3, as reference wing area multiplied by dynamic pressure and $C_{z\alpha}$. Division block 340 completes the calculation of the first term in Equation 3 by dividing aircraft weight by the output of product block 338. Sum junction 334 subtracts an angle of attack limit from the aircraft angle of attack and multiplies this in product block 342 by the output of division block 340. Current aircraft load factor is added to the output of product block 342 in sum block 344. FIG. 5 is not included in the embodiment in FIG. 3, but could be part of a different embodiment of this disclosure which included a load factor inner loop control law instead of an angle of attack inner loop control law.

Figure 6:
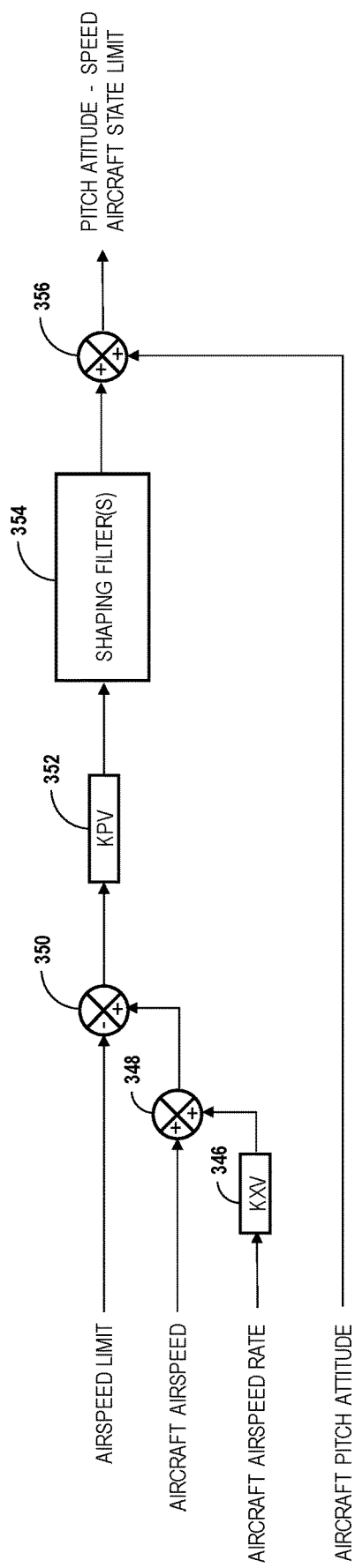
FIG. 6 is a block diagram illustrating functions for conversion of an airspeed aircraft state limit to an equivalent pitch attitude aircraft state limit, according to an example implementation.

FIG. 6 is a block diagram illustrating functions for conversion of speed to an equivalent pitch attitude (shown at block 310 in FIG. 3), according to an example embodiment. Initially, an aircraft airspeed rate (e.g., rate of change of the aircraft airspeed) is received and a KXV gain is applied at block 346. The KXV gain is an airspeed lead gain used to cause the envelope limiting control law to engage earlier when accelerating to the airspeed limit rapidly. An output of block 346 is provided to a summer 348 with an aircraft airspeed, and the summation output is provided to a summer 350 along with an airspeed limit to form an airspeed error. An output of summer 350 is provided to a KPV gain, which is an airspeed proportional error gain, and then provided to shaping filter(s) 354. The shaping filter(s) 354 applies a gain and phase shift to the airspeed error. In one implementation, shaping filters 354 are based on the aircraft dynamics relating airspeed and pitch attitude. An output of the shaping filter(s) 354 is summed with an aircraft pitch attitude at summer 356 to obtain the pitch attitude speed limit command.

Figure 7:
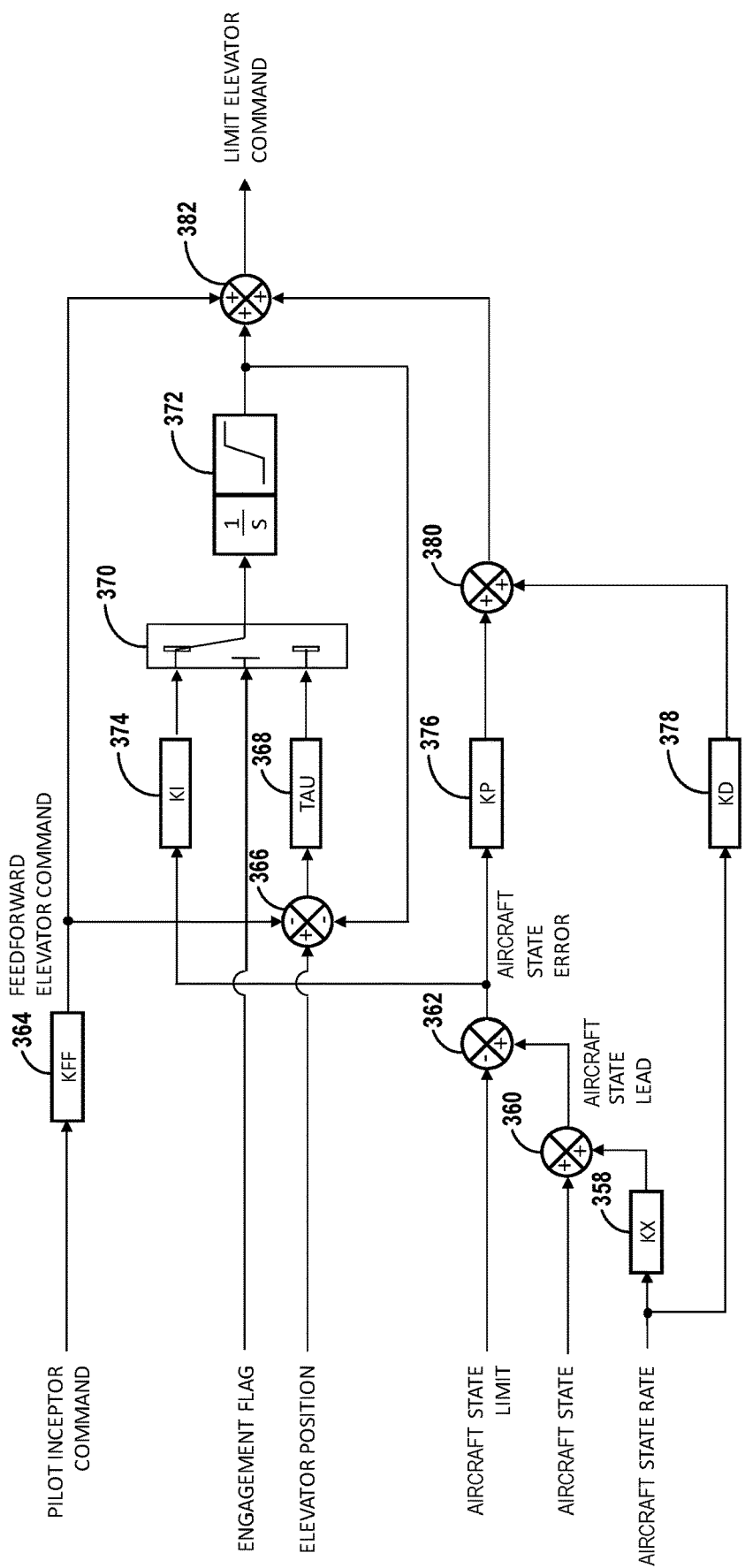
FIG. 7 is a block diagram illustrating functions for an envelope limiting control law, according to an example implementation.

FIG. 7 is a block diagram illustrating functions for an envelope limiting inner loop (the AOA control law inner loop, shown at block 308 in FIG. 3 or the pitch attitude control law inner loop, shown at block 316 in FIG. 3), according to an example embodiment. The algorithm is performed for each protected state (e.g., load factor, angle of attack, pitch attitude, airspeed, etc.).

Initially, at block 358 a KX gain (e.g., aircraft state lead gain used to cause the envelope limiting control law to engage earlier when approaching the limit rapidly) is applied to an aircraft state rate, and then an output is summed at summer 360 with an aircraft state. The aircraft state rate is a rate of change of the aircraft state, and the aircraft state is a pitch axis variable, such as angle of attack, pitch rate, airspeed, pitch attitude, etc.

The output of summer 360 is an aircraft state lead. For example, a current angle of attack, angle of attack rate, and gain KX are used to compute the aircraft state lead, and this is a predicted angle of attack in KX seconds.

Following, aircraft state limits are received and subtracted from the aircraft state lead at summer 362 to generate an aircraft state error. The aircraft state limits are an output of block 306 or block 314, for example. Thus, the predicted aircraft states are compared to the aircraft state limits to produce aircraft state errors for each of the multiple pitch axis variables.

A pilot inceptor command (e.g., a command representing displacement of, for example, a control column, that the pilot would pull or push to pitch the aircraft 100 up or down) is received and a KFF gain (e.g., a feedforward gain used to provide direct gearing between changes in pilot inceptor command and changes in a control surface) is applied at block 364 to output a feedforward elevator command. Thus, a feedforward elevator command is determined that is proportional to the pilot inceptor command. The feedforward elevator command is input to summer 366, and subtracted from an elevator position less the output of the integrator block 372. The output of summer 366 is multiplied by a gain TAU applied at block 368, and is the false input to switch 370.

An engagement flag is received, which is a discrete signal that sets the polarity of switch 370 in the inner loop architecture. Switch 370 transitions, depending on the engagement flag being true or false, between calculating a filtered version of the current elevator position less the feedforward elevator command and an integral error. If the engagement flag is false, the gain TAU and integrator 372 apply a lag filter to the elevator position less the feedforward elevator command, as shown at block 372. This forms a reference elevator position (which can be non-zero). In steady or quasi steady-state operation, the subtraction of the feedforward term from the elevator position helps to ensure the limiting control laws only activate when the aircraft state exceeds the aircraft state limit. Absent subtracting the feedforward elevator command, the control law would not engage at the proper time.

Additionally, a KI gain (e.g., aircraft state integral error gain) is applied to the aircraft state error at block 374 and this path feeds into the integrator 372 when the engagement flag is true.

The limit elevator command is computed by summing two paths. First, the aircraft state error has a KP gain applied at block 376 (e.g., aircraft state proportional error gain), and an output is summed at summer 380 with an output of the aircraft state rate and KD gain (e.g., aircraft state rate derivative gain) from block 378. The output of summer 380 is summed with the feedforward elevator command and an output of block 372 at summer 382 to generate the limit elevator command.

The functions in the block diagram of FIG. 7 for an envelope limiting inner loop (the AOA control law inner loop, shown at block 308 in FIG. 3 or the pitch attitude control law inner loop, shown at block 316 in FIG. 3) thus translate the aircraft state errors into a set of limit elevator commands, which may be positive and negative limit elevator commands, for example.

Referring back to FIG. 3, the engagement and prioritization logic 318 then both compares the set of positive limit elevator commands is compared to each other and a highest priority positive limit elevator command is selected, and the set of negative limit elevator commands is compared to each other and a highest priority negative limit elevator command is selected. In the event of a conflict between the positive and negative elevator limit commands, a highest priority command is selected between them which sets the selected elevator command.

As an example embodiment of the prioritization component of logic 318 in FIG. 3, consider an instance whether there are two positive elevator limit commands, one for pitch attitude, and one for load factor. If the lower pitch attitude limit elevator command is +15° and the lower load factor limit elevator command is +25°, then the lower pitch attitude limit elevator command would be selected as the highest priority positive limit elevator command as it is the most restrictive limit.

As another example embodiment of the engagement component of logic 318 in FIG. 3, consider a case where the selected elevator command output from block 320 was not limited by either the highest priority positive or negative limit elevator command. In this case, the engagement flags output from block 318 would all be false.

As yet another example embodiment of the engagement component of logic 318 in FIG. 3, consider a case where the selected elevator command output from block 320 is limited by the highest priority positive limit elevator command, and the highest priority limit elevator command corresponds to the lower pitch attitude limit elevator command. The engagement flag for the lower pitch attitude inner loop control law 316 would be set true, while all other engagement flags would be set false.

The control architecture in FIGS. 3-7 enables robust pitch axis envelope limiting of multiple, potentially conflicting, states. First, load factor is translated to AOA and speed is translated to pitch attitude to reduce the number of states to manage. Error and rate paths combine with the lag elevator reference to produce limit commands. A rate of approach to the limit is accounted for via the KX path (in FIG. 7) which, for high entry rates, will cause the control law to activate sooner. These limit commands bound the primary pitch axis control law command, and prevent large undesirable inputs from reaching the elevator when operating close to an envelope boundary. Envelope limiting control laws engage via a saturation block (e.g., shown in FIG. 3 as block 320) which guarantees a simple, transient-free switch between control laws. Transient-free behavior is desired when transitioning between envelope limiting control law modes to ensure a predictable and easily controllable aircraft response. Prioritization of aircraft states being limited is achieved when conflicts arise via comparison of the individual limit elevator command paths.

Figure 8:
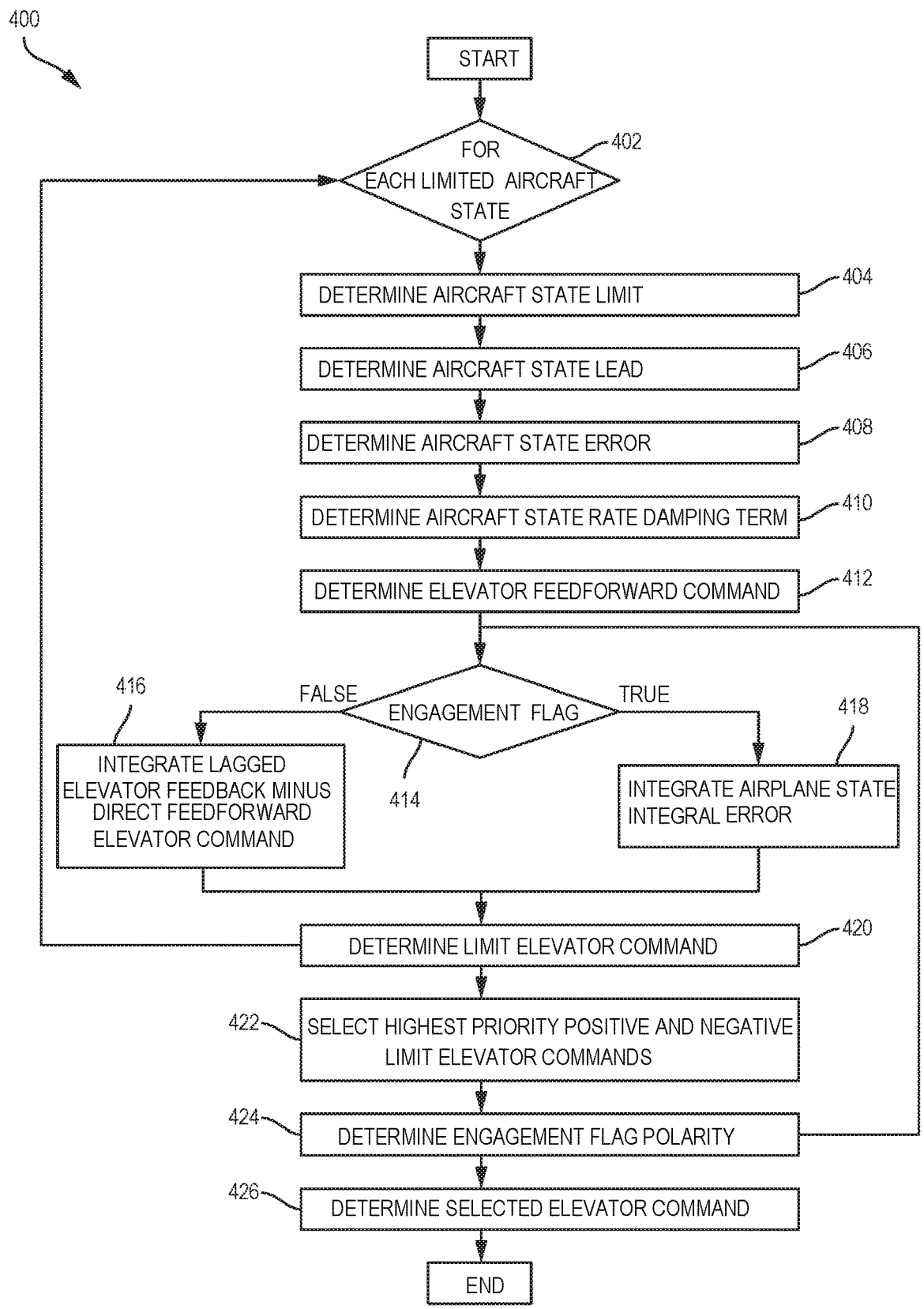
FIG. 8 shows a flowchart of another example of a method of limiting the aircraft to a pitch axis envelope, according to an example implementation.

FIG. 8 shows a flowchart of another example of a method 400 of limiting the aircraft 100 to a pitch axis envelope, according to an example implementation. Method 400 shown in FIG. 8 presents an example of a method that could be used with the aircraft 100 shown in FIG. 1, with the system 200 shown in FIG. 2, or with the computing device 202 and/or the processor(s) 204 shown in FIG. 2, for example. Further, devices or systems may be used or configured to perform logical functions presented in FIG. 8. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 400 may include one or more operations, functions, or actions as illustrated by one or more of blocks 402-426. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer-readable medium or data storage, for example, such as a storage device including a disk or hard drive. Further, the program code can be encoded on a computer-readable storage media in a machine-readable format, or on other non-transitory media or articles of manufacture. The computer-readable medium may include non-transitory computer-readable medium or memory, for example, such as computer-readable media that stores data for short periods of time like register memory, processor cache and Random Access Memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a tangible computer-readable storage medium, for example.

In addition, each block or portions of each block in FIG. 8, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 402, the method 400 enters a for-loop over each limited aircraft state, executing blocks 404 to 420 as part of this loop. In one example, these limited aircraft states include the angle of attack and pitch attitude of the aircraft 100.

At block 404, the method 400 includes determining an aircraft state limit associated with the limited aircraft state as determined in block 402. These aircraft state limits could be pre-determined constant values, or, as shown in FIGS. 4 to 6, calculated equivalent aircraft state limits. In one example, block 404 includes determining the aircraft state limits associated with an angle of attack of the aircraft 100, a load factor of the aircraft 100, a pitch attitude of the aircraft 100, and a calibrated airspeed of the aircraft 100.

In one example, block 404 includes translating load factor difference into an equivalent angle of attack aircraft state limit (e.g., as shown above in FIG. 4). This sets the aircraft state limit in FIG. 7.

In another example, block 404 includes translating the angle of attack difference into an equivalent load factor aircraft state limit (e.g., as shown above in FIG. 5). This sets the aircraft state limit in FIG. 7.

In another example, block 404 includes translating an airspeed difference into an equivalent pitch attitude aircraft state limit (e.g., as shown above in FIG. 6). This sets the aircraft state limit in FIG. 7.

In another example, block 404 includes selecting a highest priority aircraft state limit for a pitch axis variable. For example, given an angle of attack aircraft state limit associated with stall warning and a load factor based angle of attack state limit, a highest priority aircraft state limit between the two is selected. Block 306 in FIG. 3 illustrates this prioritization via a min-select block.

Additionally, in another example, given a lower (nose down) pitch attitude aircraft state limit and an airspeed based lower pitch attitude aircraft state limit, a highest priority aircraft state limit between the two is selected. Block 314 in FIG. 3 illustrates this prioritization via a max-select block.

At block 406, the method 400 includes determining predicted aircraft states based on a current pitch axis variables of the aircraft and rate of the current pitch axis variables. The predicted aircraft states are indicative of aircraft states at a future time. This is helpful to make estimations of whether the aircraft 100 is trending toward operation that may exceed the protection envelope.

At block 408, the method 400 includes comparing the predicted aircraft states to the aircraft state limits to produce aircraft state errors for each of the multiple pitch axis variables. In one example, block 408 includes producing an angle of attack error and a pitch attitude error. These errors are used for identifying how close the aircraft 100 is to exceeding the protection envelope.

At block 410, the method 400 includes determining the aircraft state rate damping term. In one example, this damping term is calculated by multiplying the aircraft state rate by a gain, to be included as part of the limit elevator command.

At block 412, the method 400 includes determining an elevator feedforward command. In one example, this elevator feedforward command is calculated by multiplying the pilot inceptor displacement by a gain. This term is used to provide a prompt aircraft response to a pilot command.

At block 414, the method 400 includes evaluating whether the engagement flag variable is true or false. In FIG. 7, this corresponds to block 370. The polarity of the engagement flag sets which term is integrated in either block 416 or block 418.

At block 416, the method 400 includes integrating the lagged elevator feedback minus the feedforward elevator command. It is active only when the engagement flag is false. This path corresponds to blocks 366 and 368 in FIG. 7. As a result of this calculation, the output of the integrator, block 372 in FIG. 7, corresponds to a filtered version of the elevator position minus the feedforward elevator command with frequency given by the gain block 368 in FIG. 7.

At block 418, the method 400 includes integrating the aircraft state integral error. It is active only when the engagement flag is true. This path corresponds to block 374 in FIG. 7. When this path is selected, integral control is provided to ensure steady-state tracking of the selected aircraft state limit from block 404.

At block 420, the method 400 includes determining a limit elevator command for the limited aircraft state selected in block 402. The calculation includes the summers 380 and 382 in FIG. 7, which incorporate the direct elevator feedforward command, integrator output, proportional error path, and aircraft state rate damping term.

At block 422, the method 400 includes comparing the set of positive and negative limit elevator commands and selecting a highest priority positive and negative limit elevator command. In one example, block 422 includes selecting a most limiting positive limit elevator command. In another example, block 422 includes selecting a most limiting negative limit elevator command. In a specific example, if the aircraft 100 is exceeding both a nose up angle of attack and pitch attitude limit, the processor is programmed in this instance to choose the most nose down command between the two.

In further examples, at block 422 the method 400 may include additional functions for comparing the highest priority positive limit elevator command to the highest priority negative limit elevator command, and based on a conflict between the highest priority positive and negative limit elevator command, selecting a highest priority limit elevator command between them. This highest priority limit elevator command would then become the selected elevator command. For example, it may not be possible to simultaneously satisfy a positive and negative elevator limit. An example instance includes if the aircraft 100 has lost a significant amount of airspeed and is at a high angle of attack, the angle of attack limiting part of the control law will want to pitch the aircraft 100 down. However, pitching the aircraft 100 down to protect angle of attack may cause the aircraft 100 to violate a lower load factor or pitch attitude limit. In response, these positive elevator limit commands will attempt to pitch the aircraft 100 up. Since both limits cannot be satisfied at the same time, a decision is made to select the command with a higher priority. The selection of highest priority command is programmed and based on flight dynamics and which state limits are most essential in each situation. For example, keeping angle of attack in a proper range is necessary to prevent stall and is often considered the highest priority state during upset recovery.

At block 424, the method 400 includes determining engagement flag polarity for each limited aircraft state. In a specific example, if the primary pitch axis elevator command is less than the highest priority positive limit elevator command and greater than the highest priority negative limit elevator command, the engagement flag for each state will be false. In another specific example, if the highest priority negative limit elevator command is associated with the angle of attack state, and the primary pitch axis elevator command is less than this limit elevator command, the engagement flag associated with the angle of attack aircraft state will be set true while all others will be false.

At block 426, the method 400 includes limiting the primary pitch axis control law elevator command to a value that is less than or equal to the highest priority positive limit elevator command and greater than or equal to the highest priority negative limit elevator command. The primary pitch axis control law elevator command may be stored and programmed into the computing device 202 and the processor(s) 204 and/or the computing device 202 may send a control signal to the flight control surface actuators 218 to operate the elevator 112 according to the elevator command.

In further examples, the method 400 may include additional functions for expressing the limit commands in terms of the pilot inceptor command, with these limit commands applied to the pilot inceptor command in place of the selected elevator command. The pilot inceptor command is meant to represent the displacement of, for example, a center column, which the pilot would pull or push to pitch the aircraft up or down.

In further examples, the method 400 may include additional functions for limiting any aircraft control surface and aircraft state according to the limit commands.

Figure 9:
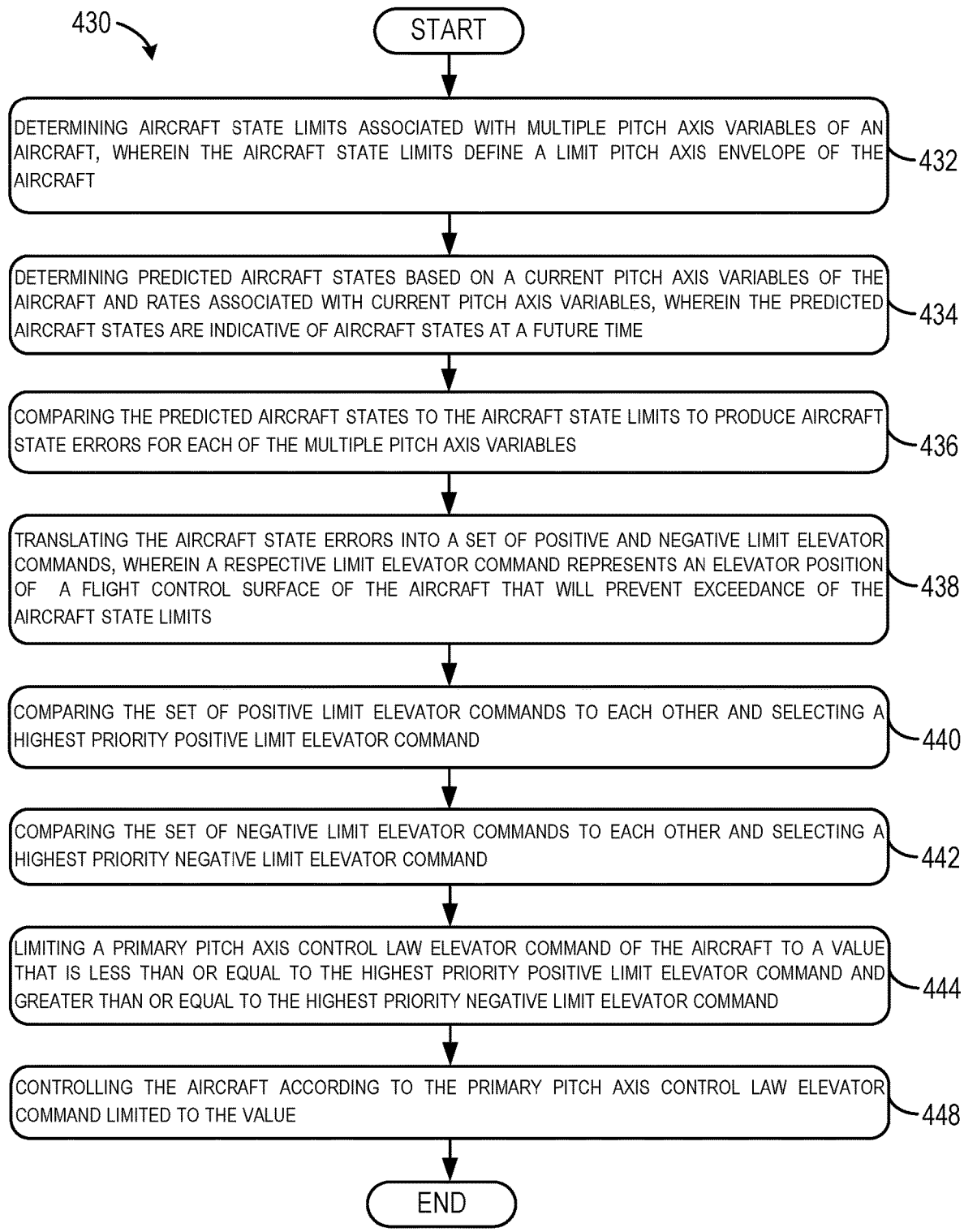
FIG. 9 shows a flowchart of another example of a method of limiting the aircraft to a pitch axis envelope, according to an example implementation.

FIG. 9 shows a flowchart of another example of a method 430 of limiting the aircraft 100 to a pitch axis envelope, according to an example implementation. Method 430 is similar to method 400 shown in FIG. 8, and represents a more general method of functions for performing the limiting of the aircraft to the pitch axis envelope, for example.

At block 432, the method 430 includes determining aircraft state limits associated with multiple pitch axis variables of an aircraft, and the aircraft state limits define a limit pitch axis envelope of the aircraft. In one example, determining the aircraft state limits includes determining the aircraft state limits associated with an angle of attack of the aircraft, a load factor of the aircraft, a pitch attitude of the aircraft, and a calibrated airspeed of the aircraft.

At block 434, the method 430 includes determining predicted aircraft states based on current pitch axis variables of the aircraft and rates associated with the current pitch axis variables, and the predicted aircraft states are indicative of aircraft states at a future time.

At block 436, the method 430 includes comparing the predicted aircraft states to the aircraft state limits to produce aircraft state errors for each of the multiple pitch axis variables. In one example, comparing the predicted aircraft states to the aircraft state limits includes producing an angle of attack difference, a load factor difference, and a speed difference.

At block 438, the method 430 includes translating the aircraft state errors into a set of positive and negative limit elevator commands, and a respective limit elevator command represents an elevator position of a flight control surface of the aircraft that will prevent exceedance of the respective aircraft state limits.

In one example, translating the aircraft state errors includes translating the angle of attack difference into an equivalent load factor aircraft state limit, receiving a load factor aircraft state limit, and selecting a highest priority limit between the load factor aircraft state limit and the equivalent load factor aircraft state limit.

In another example, translating the aircraft state errors includes translating the load factor difference into an equivalent angle of attack aircraft state limit, receiving an angle of attack aircraft state limit, and selecting a highest priority limit between the angle of attack aircraft state limit and the equivalent angle of attack aircraft state limit.

In still another example, translating the aircraft state errors includes translating the speed difference into an equivalent pitch attitude aircraft state limit, receiving a lower pitch attitude aircraft state limit, and selecting a highest priority limit between the lower pitch attitude aircraft state limit and the equivalent pitch attitude aircraft state limit.

At block 440, the method 430 includes comparing the set of positive limit elevator commands to each other and selecting a highest priority positive limit elevator command.

At block 442, the method 430 includes comparing the set of negative limit elevator commands to each other and selecting a highest priority negative limit elevator command.

At block 444, the method 430 includes limiting a primary pitch axis control law elevator command of the aircraft to a value that is less than or equal to the highest priority positive limit elevator command and greater than or equal to the highest priority negative limit elevator command.

At block 448, the method 430 includes controlling the aircraft according to the primary pitch axis control law elevator command limited to the value. In one example, controlling the aircraft according to the primary pitch axis control law elevator command limited to the value includes controlling the aircraft for any aircraft state according to the primary pitch axis control law elevator command applied to any aircraft control surface.

In further examples, the method 430 may additional include functions for determining an engagement flag for each pitch axis variable being limited, setting the engagement flag true when the primary pitch axis control law elevator command is limited by a limit elevator command associated with that pitch axis variable, and setting the engagement flag false when the primary pitch axis control law elevator command is not being limited by the limit elevator command associated with that pitch axis variable.

In further examples, the method 430 may additional include functions for providing an integrator for each pitch axis variable being limited, with an integrator input value set based on the engagement flag, and when the engagement flag is true, the integrator input value is proportional to the aircraft state errors, and wherein when the engagement flag is false, the integrator input value is set to provide a filtered elevator position minus a feedforward elevator command, wherein the feedforward elevator command is a pilot or autopilot provided elevator command.

In further examples, the method 430 may additional include functions for comparing the highest priority positive limit elevator command to the highest priority negative limit elevator command, based on a conflict between the highest priority positive limit elevator command and the highest priority negative limit elevator command, selecting the highest priority limit elevator command between them, and setting the selected highest priority limit elevator command as the elevator command.

In further examples, the highest priority positive limit elevator command and the highest priority negative limit elevator command are expressed in terms of the pilot inceptor command, and the method 430 may additional include functions for applying the value that is less than or equal to the highest priority positive limit elevator command and greater than or equal to the highest priority negative limit elevator command to the pilot inceptor command.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

In view of the present disclosure, it will be appreciated that by limiting the primary pitch axis control law elevator command to a value that is less than or equal to a highest priority positive limit elevator command and greater than or equal to a highest priority negative limit elevator command, implemented in accordance with various examples set forth herein, may provide for an improved approach to limiting an aircraft to within a pitch axis envelope. In this regard, the control architecture disclosed provides robust limiting and a simple means to transition in and out of pitch axis protection modes. Elevator commands that would otherwise create a large and undesirable pitch response are intercepted before they are allowed to set the final elevator command, which results in improved limiting performance.

The present disclosure describes an approach for expressing a load factor limit in terms of angle of attack, an angle of attack limit in terms of load factor, and an airspeed limit in terms of pitch attitude. These techniques enable a single control law inner loop to regulate and seamlessly transition between two aircraft states, thereby significantly lowering complexity and reducing design work.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method of limiting an aircraft to a pitch axis envelope, the method comprising:
    determining aircraft state limits associated with multiple pitch axis variables of an aircraft, wherein the aircraft state limits define a limit pitch axis envelope of the aircraft;
    determining predicted aircraft states based on current pitch axis variables of the aircraft and rates associated with the current pitch axis variables, wherein the predicted aircraft states are indicative of aircraft states at a future time;
    comparing the predicted aircraft states to the aircraft state limits to produce aircraft state errors for each of the multiple pitch axis variables;
    translating the aircraft state errors into a set of positive and negative limit elevator commands, wherein a respective limit elevator command represents an elevator position of a flight control surface of the aircraft that will prevent exceedance of the respective aircraft state limits;
    comparing the set of positive limit elevator commands to each other and selecting a highest priority positive limit elevator command;
    comparing the set of negative limit elevator commands to each other and selecting a highest priority negative limit elevator command;
    limiting a primary pitch axis control law elevator command of the aircraft to a value that is less than or equal to the highest priority positive limit elevator command and greater than or equal to the highest priority negative limit elevator command;
    comparing the highest priority positive limit elevator command to the highest priority negative limit elevator command;
    based on a conflict between the highest priority positive limit elevator command and the highest priority negative limit elevator command, selecting a highest priority limit elevator command between them;
    setting the selected highest priority limit elevator command as the primary pitch axis control law elevator command; and
    controlling the aircraft according to the primary pitch axis control law elevator command limited to the value.

2. The method of claim 1, wherein said determining the aircraft state limits comprises determining the aircraft state limits associated with an angle of attack of the aircraft, a load factor of the aircraft, a pitch attitude of the aircraft, and a calibrated airspeed of the aircraft.

3. The method of claim 2, wherein said comparing the predicted aircraft states to the aircraft state limits comprises producing an angle of attack difference, a load factor difference, and a speed difference.

4. The method of claim 3, wherein said translating the aircraft state errors comprises:
    translating the angle of attack difference into an equivalent load factor aircraft state limit; and
    receiving a load factor aircraft state limit;
    wherein said determining the aircraft state limits associated with the load factor of the aircraft comprises selecting a highest priority limit between the load factor aircraft state limit and the equivalent load factor aircraft state limit.

5. The method of claim 3, wherein said translating the aircraft state errors comprises:
   translating the load factor difference into an equivalent angle of attack aircraft state limit; and
   receiving an angle of attack aircraft state limit;
   wherein said determining the aircraft state limits associated with the angle of attack of the aircraft comprises selecting a highest priority limit between the angle of attack aircraft state limit and the equivalent angle of attack aircraft state limit.

6. The method of claim 3, wherein said translating the aircraft state errors comprises:
   translating the speed difference into an equivalent pitch attitude aircraft state limit; and
   receiving a lower pitch attitude aircraft state limit;
   wherein said determining the aircraft state limits associated with the pitch attitude of the aircraft comprises selecting a highest priority limit between the lower pitch attitude aircraft state limit and the equivalent pitch attitude aircraft state limit.

7. The method of claim 1, further comprising:
   determining an engagement flag for each pitch axis variable being limited;
   setting the engagement flag true if the primary pitch axis control law elevator command is limited by a limit elevator command associated with that pitch axis variable; and
   setting the engagement flag false if the primary pitch axis control law elevator command is not being limited by the limit elevator command associated with that pitch axis variable.

8. The method of claim 7, further comprising:
   providing an integrator for each pitch axis variable being limited, with an integrator input value set based on the engagement flag, and
   wherein if the engagement flag is true, the integrator input value is proportional to the aircraft state errors; and
   wherein if the engagement flag is false, the integrator input value is set to provide a filtered elevator position minus a feedforward elevator command, wherein the feedforward elevator command is a pilot or autopilot provided elevator command.

9. The method of claim 1, wherein the highest priority positive limit elevator command and the highest priority negative limit elevator command are expressed in terms of a pilot inceptor command, and the method further comprises:
   applying the value that is less than or equal to the highest priority positive limit elevator command and greater than or equal to the highest priority negative limit elevator command to the pilot inceptor command.

10. A system comprising:
   a non-transitory computer-readable medium having stored therein a plurality of executable instructions; and
   a processor adapted to execute the plurality of executable instructions to:
      determine aircraft state limits associated with multiple pitch axis variables of an aircraft, wherein the aircraft state limits define a limit pitch axis envelope;
      determine predicted aircraft states based on current pitch axis variables of the aircraft and rate of the current pitch axis variables, wherein the predicted aircraft states are indicative of aircraft states at a future time;
      compare the predicted aircraft states to the aircraft state limits to produce aircraft state errors for each of the multiple pitch axis variables;
      translate the aircraft state errors into a set of positive and negative limit elevator commands, wherein a respective limit elevator command represents an elevator position of a flight control surface of the aircraft that will prevent exceedance of the aircraft state limits;
      compare the set of positive limit elevator commands to each other and selecting a highest priority positive limit elevator command;
      compare the set of negative limit elevator commands to each other and selecting a highest priority negative limit elevator command;
      limit a primary pitch axis control law elevator command of the aircraft to a value that is less than or equal to the highest priority positive limit elevator command and greater than or equal to the highest priority negative limit elevator command;
      compare the highest priority positive limit elevator command to the highest priority negative limit elevator command;
      based on a conflict between the highest priority positive limit elevator command and the highest priority negative limit elevator command, select a highest priority limit elevator command between them;
      set the selected highest priority limit elevator command as the primary pitch axis control law elevator command; and
      control the aircraft according to the primary pitch axis control law elevator command limited to the value.

11. The system of claim 10, wherein said determine the aircraft state limits comprises determining the aircraft state limits associated with an angle of attack of the aircraft, a load factor of the aircraft, a pitch attitude of the aircraft, and a calibrated airspeed of the aircraft.

12. The system of claim 11, wherein said compare the predicted aircraft states to the aircraft state limits comprises producing an angle of attack difference, a load factor difference, and a speed difference.

13. The system of claim 12, wherein said translate the aircraft state errors comprises:
   translating the angle of attack difference into an equivalent load factor aircraft state limit; and
   receiving a load factor aircraft state limit;
   wherein said determine the aircraft state limit associated with the load factor of the aircraft comprises selecting a highest priority limit between the load factor aircraft state limit and the equivalent load factor aircraft state limit.

14. The system of claim 12, wherein said translate the aircraft state errors comprises:
   translating the load factor difference into an equivalent angle of attack aircraft state limit; and
   receiving an angle of attack aircraft state limit;
   wherein said determine the aircraft state limits associated with the angle of attack of the aircraft comprises selecting a highest priority limit between the angle of attack aircraft state limit and the equivalent angle of attack aircraft state limit.

15. A non-transitory computer-readable medium having stored therein a plurality of executable instructions, which when executed by a computing device having a processor causes the computing device to perform functions comprising:
   determining aircraft state limits associated with multiple pitch axis variables of an aircraft, wherein the aircraft state limits define a limit pitch axis envelope;

determining predicted aircraft states based on current pitch axis variables of the aircraft and rate of the current pitch axis variables, wherein the predicted aircraft states are indicative of aircraft states at a future time;

comparing the predicted aircraft states to the aircraft state limits to produce aircraft state errors for each of the multiple pitch axis variables;

translating the aircraft state errors into a set of positive and negative limit elevator commands, wherein a respective limit elevator command represents an elevator position of a flight control surface of the aircraft that will prevent exceedance of the aircraft state limits;

comparing the set of positive limit elevator commands to each other and selecting a highest priority positive limit elevator command;

comparing the set of negative limit elevator commands to each other and selecting a highest priority negative limit elevator command;

limiting a primary pitch axis control law elevator command of the aircraft to a value that is less than or equal to the highest priority positive limit elevator command and greater than or equal to the highest priority negative limit elevator command;

comparing the highest priority positive limit elevator command to the highest priority negative limit elevator command;

based on a conflict between the highest priority positive limit elevator command and the highest priority negative limit elevator command, selecting a highest priority limit elevator command between them;

setting the selected highest priority limit elevator command as the primary pitch axis control law elevator command; and controlling the aircraft according to the primary pitch axis control law elevator command limited to the value.

16. The non-transitory computer-readable medium of claim 15, wherein said determining the aircraft state limits comprises determining the aircraft state limits associated with an angle of attack of the aircraft, a load factor of the aircraft, a pitch attitude of the aircraft, and a calibrated airspeed of the aircraft.

17. The non-transitory computer-readable medium of claim 16, wherein said comparing the predicted aircraft states to the aircraft state limits comprises producing an angle of attack difference, a load factor difference, and a speed difference.

18. The non-transitory computer-readable medium of claim 17, wherein said translating the aircraft state errors comprises:

translating the angle of attack difference into an equivalent load factor aircraft state limit; and receiving a load factor aircraft state limit;

wherein said determining the aircraft state limit associated with the load factor of the aircraft comprises selecting a highest priority limit between the load factor aircraft state limit and the equivalent load factor aircraft state limit.

19. The non-transitory computer-readable medium of claim 17, wherein said translating the aircraft state errors comprises:

translating the load factor difference into an equivalent angle of attack aircraft state limit; and receiving an angle of attack aircraft state limit;

wherein said determining the aircraft state limits associated with the angle of attack of the aircraft comprises selecting a highest priority limit between the angle of attack aircraft state limit and the equivalent angle of attack aircraft state limit.

20. The non-transitory computer-readable medium of claim 15, wherein the highest priority positive limit elevator command and the highest priority negative limit elevator command are expressed in terms of a pilot inceptor command, and the functions further comprise:

applying the value that is less than or equal to the highest priority positive limit elevator command and greater than or equal to the highest priority negative limit elevator command to the pilot inceptor command.

* * * * *